United States Patent [19]

Berch et al.

[11] Patent Number: 4,974,879

[45] **Date of Patent: * Dec. 4, 1990**

[54] PASS-THROUGH TUBE FOR PRESSURIZED CHAMBER

[75] Inventors: Stephen W. Berch, Arvada; Leslie M. Baines, Boulder, both of Colo.

[73] Assignee: Cobe Laboratories, Inc., Lakewood, Colo.

[*] Notice: The portion of the term of this patent subsequent to Apr. 11, 2006 has been disclaimed.

[21] Appl. No.: 278,811

[22] Filed: Dec. 2, 1988

Related U.S. Application Data

[62] Division of Ser. No. 6,366, Jan. 23, 1987, Pat. No. 4,820,280.

[51] Int. Cl.[5] .......... F16L 5/00

[52] U.S. Cl. .......... 285/158; 600/21; 604/905; 128/202.12; 285/174; 285/246; 285/255; 285/346

[58] Field of Search .......... 285/158, 169, 175, 246, 285/247, 255, 346, 348; 128/202.12; 600/21, 22; 604/905

[56] References Cited

U.S. PATENT DOCUMENTS

| | | | |
|---|---|---|---|
| 375,015 | 12/1887 | Smith | 128/202.12 |
| 2,854,027 | 9/1958 | Kaiser et al. | 137/625.41 |
| 3,276,472 | 10/1966 | Jinkens et al. . | |
| 3,490,775 | 1/1970 | Henshaw | 277/203 |
| 4,346,703 | 8/1982 | Dennehey et al. | 128/213 A |
| 4,369,781 | 1/1983 | Gilson et al. | 128/214 R |
| 4,452,473 | 6/1984 | Ruschke | 285/81 |
| 4,467,798 | 8/1984 | Saxon | 128/202.12 X |
| 4,485,014 | 11/1984 | Gilroy et al. | 210/433.2 |
| 4,582,055 | 4/1986 | McDougal | 128/202.12 |
| 4,588,402 | 5/1986 | Igari et al. | 604/408 |
| 4,617,012 | 10/1986 | Vaillancourt | 604/29 |
| 4,629,455 | 12/1986 | Kanno | 604/241 |
| 4,642,091 | 2/1987 | Richmond | 604/29 |
| 4,650,475 | 3/1987 | Smith et al. | 604/189 |
| 4,820,280 | 4/1989 | Berch | 604/905 X |

FOREIGN PATENT DOCUMENTS

| | | | |
|---|---|---|---|
| 0364165 | 11/1922 | Fed. Rep. of Germany | 285/169 |
| 2025034 | 11/1971 | Fed. Rep. of Germany | 285/175 |
| 0720741 | 2/1932 | France | 285/158 |
| 0461898 | 10/1968 | Switzerland | 285/158 |

*Primary Examiner*—Randolph A. Reese
*Assistant Examiner*—Carol I. Bordas

[57] ABSTRACT

A pass-through tube for use in conveying intravenous fluid to a patient in a pressurized chamber, the tube including a tubular body having an outer surface shaped and sized to sealably mate with the interior surface of a connector passing through the wall of a pressurized chamber, a first end having a first generally cylindrical surface adapted to sealably engage a similarly shaped surface of a mating first connector and first locking members for locking with mating locking members on the first connector, a second end having a second generally cylindrical surface adapted to sealably engage a similarly shaped surface of a mating second connector and second locking members for locking with mating locking members on the second connector. Also disclosed is a kit including a pass-through tube, a flexible internal tube, and a valve connected to the external end for connection to an intravenous supply line.

7 Claims, 1 Drawing Sheet

PASS-THROUGH TUBE FOR PRESSURIZED CHAMBER

This application is a division of application Ser. No. 006,366, filed Jan. 23, 1987, now U.S. Pat. No. 4,820,280.

FIELD OF THE INVENTION

The invention relates to delivering intravenous fluids to patients in pressurized chambers.

BACKGROUND OF THE INVENTION

Patients placed in pressurized chambers (e.g., a Seachrist Monoplace hyperbaric chamber) for treatment of various conditions (e.g., embolism and carbon monoxide poisoning) have been provided with intravenous fluids from bags outside of the chambers by disposable flexible delivery tubes that are connected to both ends of stainless steel pass-through tubes having outer surfaces that sealably fit in connectors defining holes through chamber doors. Between uses with different patients, a pass-through tube must be removed, sterilized and reinstalled in the door with fresh delivery tubes, which slip on and frictionally engage male or female portions of the pass-through tubes.

SUMMARY OF THE INVENTION

In general, the invention features in one aspect improving a pass-through tube for use in delivering intravenous fluid to a patient in a pressurized chamber by providing its connecting ends with locking members for locking with mating locking members on the internal and external connecting members. The locking connections prevent disconnection of the internal tube, for example by movement of the patient in the chamber, or of the external tube, owing to the pressure applied to the intravenous liquid. A disconnection of the internal or external line could result in removal of blood from the patient. A disconnection inside the chamber would require decompression, taking, for example, about 15 minutes, before opening the chamber and reconnecting the delivery line to the patent, to avoid potential patient injury (for example gas expansion in lungs).

In preferred embodiments there are helical locking projections; the pass-through member has male and female ends; the male end has a rotatable locking member carrying helical threads on it; the pass-through tube is made of plastic and has fins in portions adjacent to a cylindrical sealing portion and a flange for positioning the sealing portion in the connector.

In another aspect the invention features a kit that is for delivering intravenous fluid to a patient in a pressurized chamber and includes a disposable flexible internal delivery tube for connection to a catheter at one end, a disposable plastic pass-through tube connected to the other end of the internal delivery tube and having an outer surface shaped and sized to sealably mate with the interior surface of a connector on the pressurized chamber door, and a valve that is connected to the external end of the disposable pass-through tube and has an accessible end for connection to an intravenous supply.

In preferred embodiments the kit also includes a back check valve connected to the disposable pass-through tube to prevent fluid flow from the interior to the exterior; the pass-through tube is made of clear plastic to permit detection of trapped air in the device during fluid fill; and the valve has two ports to permit access for adding medication.

Other advantages and features of the invention will be apparent from the following description of a preferred embodiment thereof and from the claims.

DESCRIPTION OF THE PREFERRED EMBODIMENT

The preferred embodiment will now be described.

DRAWINGS

STRUCTURE

Figures 1, 2, 3, 4, 5, 6:
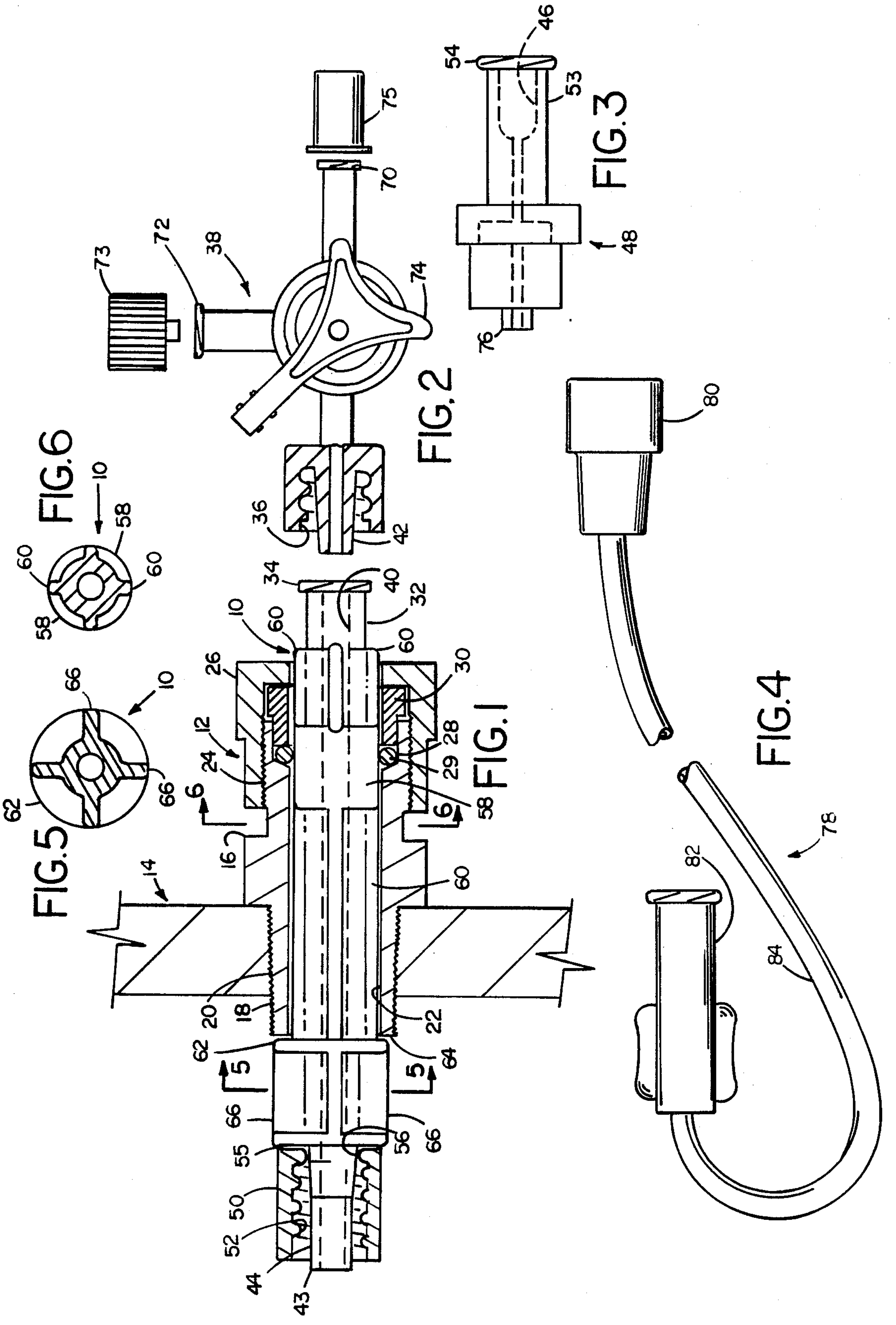
FIG. 1 is a partial sectional view showing a disposable pass-through tube according to the invention mounted in a connector passing through a door of a pressurized chamber.
FIG. 2 is a plan view, partially broken away, of a stop cock valve, for connection to an external female connecting end of the FIG. 1 pass-through tube.
FIG. 3 is a plan view of a back check valve for connection to an internal male connecting end of the FIG. 1 pass-through tube.
FIG. 4 is a plan view of a disposable internal flexible delivery tube for connection between the FIG. 3 back check valve and a catheter.
FIG. 5 is a sectional view, taken at 5—5 of FIG. 1, of the FIG. 1 pass-through tube.
FIG. 6 is a sectional view, taken at 6—6 of FIG. 1, of the FIG. 1 pass-through tube.

Referring to the FIGS., in FIG. 1 there is shown disposable plastic pass-through tube 10, sealably connected to connector 12, which passes through and is threadedly and sealably connected to door 14 of a pressurized chamber (e.g., a Seachrist Monoplace hyperbaric chamber). Connector 12 (a Cajon Ultra-Torr male connector, 6-UT-1-4) includes tube 16 connected at its threaded end 18 to threads 20 in door 14, internal cylindrical passage 22 (0.381" diameter) and threaded external end 24. Connector 12 also includes tightening nut 26, 15 elastomeric O-ring 28 (number 012, 0.070+0.003" diameter), and internal ring 30, positioned to compress 0-ring 28 against conical surface 29 when nut 26 is tightened.

Pass-through tube 10 is made of clear polycarbonate and has external female connecting end 32 with helical threads 34, for mating with threads 36 of stop cock valve 38, and internal, slightly-tapered, generally cylindrical passage 40 for mating with the similarly shaped outer surface of mating male member 42 of stop cock valve 38. This type of connection is often referred to as a luer lock connection.

On the other side of door 14, pass-through tube 10 has interior male connecting end 43, having generally cylindrical, slightly tapered, external surface 44 for mating with similarly shaped internal surface 46 of back check valve 48. Surrounding male connector end 43 is locking nut 50 having threads 52 for mating with threads 54 of female connecting end 53 of back check value 48, to provide a luer locking connection with it. Locking nut 50 has lip 55, which fits in annular recess 56 of male internal connecting end 43.

Near external female end 32 of pass-through tube 10 is cylindrical exterior sealing surface portion 58 (0.370" diameter), which is sealably engaged by O-ring 28. On both sides of cylindrical exterior sealing surface portion 58, tube 10 has fins 60 (FIG. 6). Near male connector end 43 are flange 62, for butting up against end 64 of connector 12, and fins 66 (FIG. 5). Fins 60, 66 are provided to limit volume of plastic to avoid distortions during molding.

Referring to FIG. 2, stop cock valve 38 includes luer-type locking female connectors. 70, 72, for connection to an intravenous line and for providing access, respectively. Stop cock valve 38 also includes handle 74 for controlling a closure member (not shown) to selectively connect the flow passage through male member 42 to either connector 70, 72 or to block flow to male member 42. Female luer lock plug 73 is used to stop up connector 72, and sterile cap 75, which is removed prior to use, covers connector 70.

Referring to FIG. 3, back check valve 48 includes within it a one-way flow control member (not shown) that only permits flow in the direction from its female connecting end 53 to male end 76 (tested up to 70 PSI). Referring to FIG. 4, there is shown internal disposable flexible delivery tube 78 having female luer lock connecting end 80, for connection to a catheter, female luer lock connecting end 82, for connection to male end 76 of back check valve 48, and 6 foot long PVC tube 84 therebetween.

Disposable pass-through tube 10 is packaged in a kit with stop cock valve 38, back check valve 48, and disposable flexible tube 78. All four components are connected together in the kit.

OPERATION

Disposable pass-through tube 10 and the other components shown in the drawings are used to provide intravenous (IV) fluid to a patient being treated in a pressurized chamber including door 14. The interior of the chamber, to the left of door 14, is pressurized in use (for example 3 atmospheres), and the right side of door 14 remains at atmospheric pressure. As is explained in more detail below, the kit provides the operator with a disposable, preassembled sterile set which offers ease of setup and increased patient safety.

Prior to use with a new patient, the sterile package containing pass-through tube 10, stop cock valve 38, back check valve 48, and flexible tube 78 is opened, and stop cock valve 38 is removed from tube 10 by rotating to disconnect the luer lock connection. Female end 32 is inserted through passage 22 of connector 12 until flange 62 butts up against end 64 of connector 12. Locking nut 26 is tightened, axially biasing ring 30 and compressing 0-ring 28, which expands in a radial . direction and makes a sealable connection between cylindrical exterior sealing surface surface 58 and interior sealing surface portion which is conical surface 29 of tube 16. Stop cock valve 38 is then connected to female end 32, male member 42 of stop cock valve 38 sealably engaging inner surface 40 of end 32 and being lockably connected thereto via mating helical threads 34, 36.

An IV bag (not shown) is then connected by its delivery line and an IV pump (both not shown) to luer connection 70 of stop cock valve 38. The pump is activated to fill the line with intravenous fluid, and the operator can verify that there are no trapped bubbles in tube 10, owing to its clear plastic construction. The catheter connected to end 80 of internal delivery tube 78, is inserted into the patient. Door 14 is closed, and the chamber is pressurized.

During pressure treatment of a patient, it might be necessary to replace an intravenous fluid bag after it has emptied. Before this is done, stop cock valve 38 is switched to its closed position; it is then opened after a fresh bag has been connected. Stopcock valve 38 is also used if there is a failure of the external IV lines. Stop cock valve 38 also allows the operator to shut off the fluid supply to the patient during treatment. In the event of accidental disconnection outside of the chamber, back check valve 48 prevents the intravenous fluid from being discharged outward through it. The locking connection between female end 32 of pass-through tube 10 and stopcock valve 38 prevents disconnection during treatment, something which otherwise might be a problem, owing to the 35 PSI pressure in the line. The locking connections between the components inside the chamber prevents accidental disconnection caused by movement of the patient. Connector 72 provides external access to the IV fluid line for the introduction of various medications and female luer lock plug 73 permits one to maintain a sterile site.

After use with a patient, the tube and other members are simply discarded, and there is no need to worry about damage to the parts during handling between treatments.

OTHER EMBODIMENTS

Other embodiments of the invention are within the scope of the following claims. For example, in addition to helical threads, other locking connections can be used, for example, bayonet-type connections.

What is claimed is:

1. The combination comprising a pressure chamber wall of a pressure chamber carrying a wall connector that passes through said pressure wall, is sealed to said pressure wall and has an elongated internal cylindrical passage from one side of said wall to the other for receiving a disposable plastic pass-through tube, said passage including along a portion of its length and interior sealing surface portion, and said disposable plastic pass-through tube for use in conveying intravenous fluid to a patient in said pressurized chamber, and said tube comprising an elongated tubular body having an outer surface shaped and sized to fit within said passage, said outer surface including an exterior sealing surface portion that is located along its length and shaped and sized to sealably mate with said interior sealing surface portion of said connector passing through said wall of said pressure chamber, said body having an axial flow passage through said tubular body, a first end of said tube having a first generally cylindrical surface adapted to sealably engage a similarly shaped surface of a mating first connector with first locking members for locking with mating locking members on said first end of said tube, and a second end of said tube having a second generally cylindrical surface adapted to sealably engage a similarly shaped surface of a mating second connector with second locking members for locking with mating locking members on said second end of said tube, wherein said wall connector has a means for moving said interior sealing surface portion into sealing engagement with said exterior sealing surface portion of said disposable plastic pass-through tube.

2. The combination of claim 1 wherein said first and second locking members are helical threads.

3. The combination of claim 2 wherein said first end is a female end having external helical threads and an internal surface for mating with said first connector which is a male connector.

4. The combination of claim 2 wherein said second end is a male end for mating with said second connector which is a female connector, and said helical threads are internal threads provided on a member radially outward of the male end.

5. The combination of claim 4 wherein said helical threads on said male end are provided by a rotatable locking member having a lip retained in an annular recess of said male end.

6. The combination of claim 1 further comprising a radially extending flange located on said disposable plastic pass-through tube at a predetermined axial position with respect to said exterior sealing portion of said disposable plastic pass-through tube so as to position said exterior sealing portion of said disposable plastic pass-through tube in said connector.

7. The combination of claim 1 further comprising an intravenous tube connected to said first end of said disposable plastic pass-through tube.

* * * * *